Sept. 23, 1924.

E. MEITNER 1,509,248

SELF SETTING TRANSMISSION SYSTEM

Filed April 10, 1918    2 Sheets-Sheet 1

INVENTOR
ELEMER MEITNER
BY
Herbert H. Thompson
ATTORNEY

Sept. 23, 1924.  
E. MEITNER  
1,509,248  
SELF SETTING TRANSMISSION SYSTEM  
Filed April 10, 1918   2 Sheets-Sheet 2
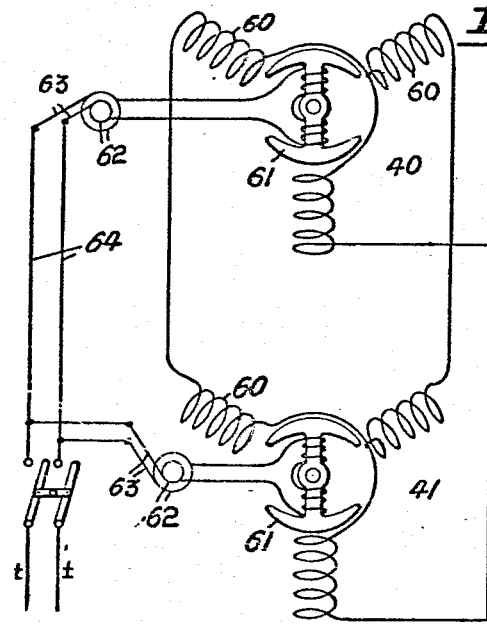
Fig. 4.
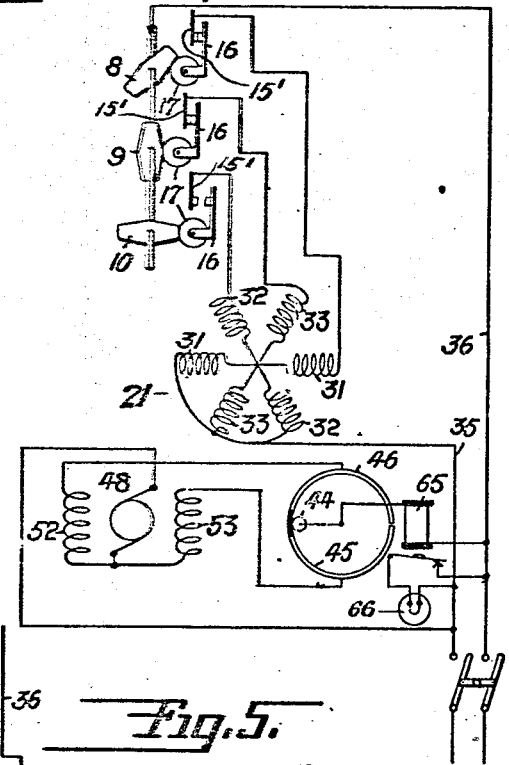
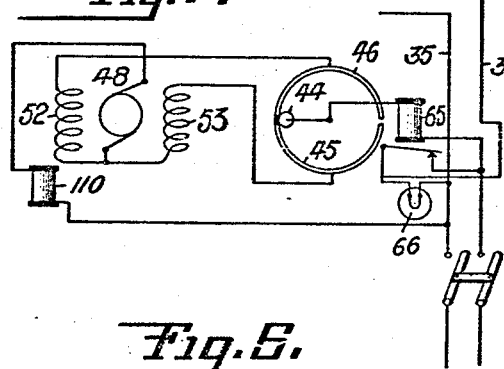
Fig. 7.
Fig. 5.
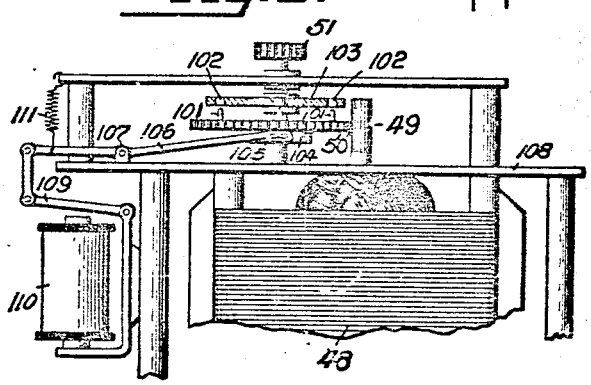
Fig. 6.
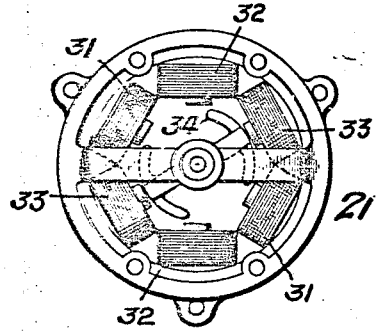
INVENTOR  
ELMER MEITNER  
BY Herbert H. Thompson  
ATTORNEY Patented Sept. 23, 1924.

1,509,248

UNITED STATES PATENT OFFICE.

ELEMER MEITNER, OF BROOKLYN, NEW YORK, ASSIGNOR TO THE SPERRY GYROSCOPE COMPANY, OF BROOKLYN, NEW YORK, A CORPORATION OF NEW YORK.

SELF-SETTING TRANSMISSION SYSTEM.

Application filed April 10, 1918. Serial No. 227,680.

*To all whom it may concern:*

Be it known that I, ELEMER MEITNER, a subject of the King of Hungary, residing at 87 Columbia Heights, Brooklyn, in the county of Kings and State of New York, have invented certain new and useful Improvements in Self-Setting Transmission Systems, of which the following is a specification.

This invention relates to transmission systems adapted to position an indicator or other device in accordance with the position of a remotely located element.

One of the principal objects of the present invention is to provide means for maintaining a repeating device in synchronism with its transmitting mechanism, or, if said devices lose synchronism, for restoring them to synchronism. Further objects and advantages will appear as the invention is hereinafter developed.

Referring to the drawings which illustrate what I now consider the preferred forms of my invention, Fig. 1 is a plan view, with parts broken away, of one form of indicator which I term a receiving device.

Fig. 4 is a wiring diagram, showing the electrical connections between the transmitting and receiving stations.

Fig. 5 is a detail of a form of step-by-step repeater.

Fig. 6 is a fragmentary detail elevation of a modified form of torque applying means.

Fig. 7 is a slightly modified wiring diagram.

Figure 1:
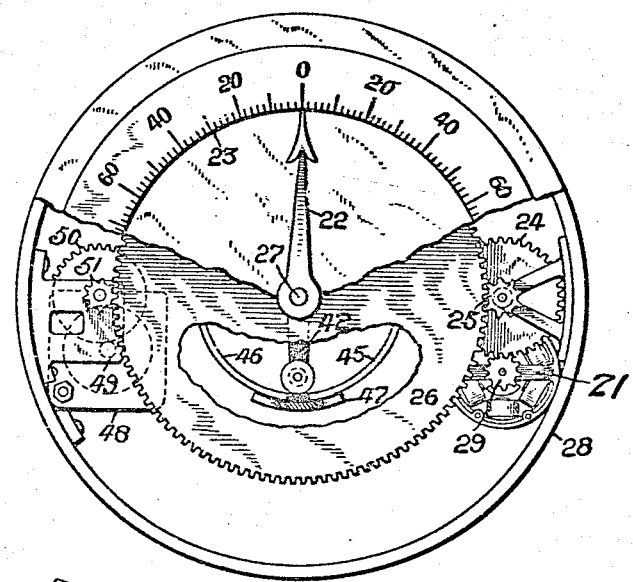

While my device is capable of wide application I have restricted the present disclosure to the application thereof to a target bearing transmitter and indicator. Calling attention to Fig. 2 it will be seen that the sending instrument comprises a telescope 1 horizontally pivoted to a shaft 2 journaled in a casing 3 and in a bracket 4 secured within the latter. A pointer 5 may be provided on shaft 2 and adapted to cooperate with a scale 6 to indicate the bearing of a target visible through the telescope 1. Suitably geared to the shaft 2 is an impulse transmitter 7 shown as comprising a plurality of cams 8, 9, 10 secured to the shaft of a pinion 11 and journaled in a bracket 12 carried by the casing 3. The pinion 11 is shown meshing with a gear 12' secured to a shaft 13 which has also secured thereon a pinion 14. The latter meshes with a gear 15 secured to shaft 2. Mounted on casing 3 but insulated therefrom and from each other are a plurality of pairs of spring contacts 15', 16, each of the latter having a roller 17 engaging the respective cam, there being one pair of such contacts for each of the cams 8, 9, and 10. Each pair of contacts may be biased to closed position by the inherent resiliency of its members and opened by the corresponding cam at the proper times. The telescope 1 and its transmitter 7 may be operated by rotating a crank 19 connected to gear 15 by means of a crown gear 20.

The receiving instrument is shown as comprising a step-by-step repeater motor 21 adapted to position a pointer 22 with reference to a scale 23 in accordance with the position of pointer 5 on its scale. The repeater motor 21 is shown secured to the inner wall of the casing 28 and geared by means of a train of gears 29, 24, 25 to a large gear 26 secured to the shaft 27 of the pointer 22.

As shown in Figs. 4 and 5 the repeater motor 21 is of the six pole type having coils 31, 32, 33 and an armature 34. The coils 31 to 33 are each so connected to a corresponding one of each of contacts 15 as to be energized from the mains 35, 36 in the following sequence, on rotation of the transmitter 7: 31, 31—32, 32, 32—33, 33 etc. or vice versa, depending on the direction of rotation of the transmitter. If the instruments as thus far described are in synchronism the pointer 22 should maintain a position in accordance with the pointer 5 and telescope 1. It has been found in practice, however, that the repeater will drop out of step or synchronism with its transmitter so that the pointer 22 will lead or lag behind pointer 5. One cause of this loss of step or synchronism may be explained by reference to Fig. 5. Thus suppose the armature 34 is in the position shown, traveling in a clockwise direction and the transmitter 7 is rapidly reversed. The transmitter 7 may rotate 90° in a counterclockwise direction, thus energizing coils 31 and 32 before the inertia of the armature 34 is overcome. The armature 34 being non-polarized may then be pulled clockwise to a position 180° out of step with its transmitter. Furthermore, if either of the shafts 2 or 27 is rotated when the instruments 7, 21 are deenergized a loss of synchronism will result which will not be restored by the system thus far described on reenergization of the latter.

Figure 2:
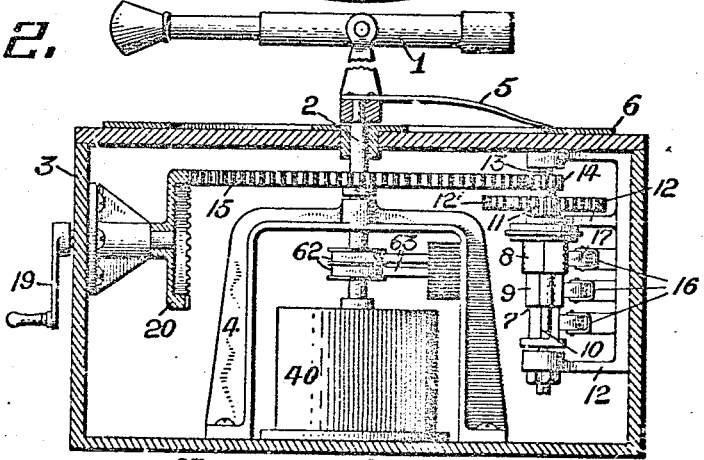
Fig. 2 is an elevation of a sending device, the casing being shown in section.
Figure 3:
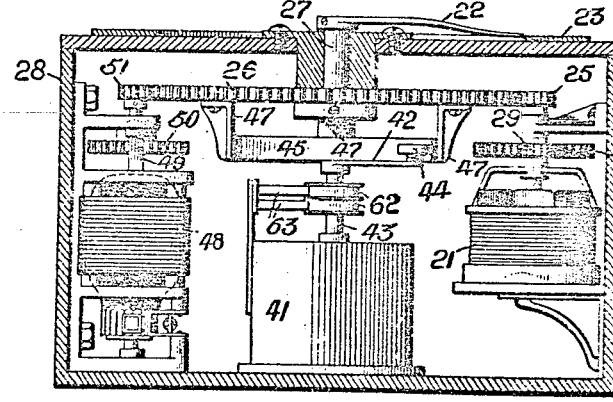
Fig. 3 is a similar view of the device shown in Fig. 1.

In order to overcome the above mentioned objections and disadvantages, I propose to provide means for automatically synchronizing the instrument. One form of such means is illustrated in Figs. 1 to 4 and may be constructed substantially as follows:

A transmitter 40 is connected to the sending instrument to be driven or positioned thereby at a much lower speed than the transmitter 7, preferably at a one-to-one ratio. In Fig. 2 I have shown the transmitter 40 directly connected to the shaft 2. In Figs. 1 and 3 I have shown a repeater 41 adapted to be electrically connected to the transmitter 40, in a manner hereinafter more specifically explained, so as to position an arm 42 on the shaft 43 of said repeater in accordance with the position of the sending instrument. The arm 42 may be provided with a roller or other electrical contact 44 adapted to cooperate with a plurality of insulated segments 45 and 46 adapted to be positioned by the shaft 27. The segments 45 and 46 are shown secured to brackets 47 secured to gear 26. The contacts 44, 45 and 46 may be employed to control means for exerting a torque to restore, automatically, the repeater 21 to synchronism when it lags behind or leads its transmitter 7. This means may assume the form of an electric motor or other translating device 48 connected to the gear 26 by means of a train of gearing 49, 50, 51.

Calling attention to Fig. 4 it will be seen that the motor 48 is provided with two field windings, 52, 53 adapted to magnetize the field in one direction or the other depending on which winding is energized. The roller 44 may be connected to the line wire 36 and one terminal of the armature of motor 48 to the other line wire 35. The other terminal of said armature is connected to one end of each of coils 52, 53 the other ends of which are connected to segments 46 and 45 respectively.

While various forms of transmitters and repeaters may be employed at 40 and 41 I prefer, at present to employ instruments, each comprising a three phase stator 60, connected as indicated diagrammatically in Fig. 4, and a single phase rotor 61. The rotor windings are shown connected, through slip rings 62 and brushes 63, to single A. C. line wires 64. It will be apparent to those skilled in the art that the arm 42 will be positioned nearly in accordance with the position of members 1 and 5 when the rotors 61 are energized. The various parts of my system are preferably so designed as to operate substantially as follows:

When the line wires 64 are energized the arm 42 will be pulled into a position corresponding closely but not exactly to the position of the members 1 and 5, whatever the position of the latter may be. If the pointer 22 occupies a position corresponding to that of member 42 the roller 44 will be out of contact with either of segments 45, 46 on the insulation between the latter. If this condition does not exist the motor 48 will be energized to run in one direction or the other to cause the gear 26 and pointer 21 to move in such a direction as to cause the insulation to move opposite roller 44. This operation will position the pointer 22, roughly, in accordance with members 1 and 5. If line wires 35, 36 are now energized the repeater armature 34 will assume a position in accordance with its transmitter 7 and position the pointer 22 accurately.

When the devices 1 and 22 are once in synchronism they will be maintained in synchronism so long as the instruments are energized. If the telescope is rotated the transmitter 7 will be rotated to cause the repeater 21 to move the pointer 22 an amount corresponding to the movement of said telescope. I wish to emphasize the fact that when the members 1 and 22 are in synchronism the transmission is entirely through the system 7—21 as the motor 48 is then deenergized. While devices 1 and 22 are moving in synchronism, arm 42 is moving also, but not in exact correspondence with the position of device 1. In this connection it should be noted that arm 42, being mounted on the same shaft as rotor 61 of repeater 41, will either lead or lag behind the rotor of transmitter 40 by the same amount as the repeater rotor. Thus an error of one degree in the position of repeater rotor 61 will cause the same error in the position of arm 42. To allow for the error in the movements of arm 42 the insulation between contact segments 45 and 46 is of sufficient extent, as shown in Figs. 1 and 4, to allow arm 42 to lead or lag behind the transmitter rotor within its limits of error without bringing roller 44 into contact with either of said segments. Repeater 21 is so geared to pointer 22 that an error of one degree in the position of armature 34 will cause an error of only one minute or less in the position of pointer 22. Furthermore, it is evident from Figs. 1 and 3 that if line wires 35 and 36 and a pair of the repeater magnets, magnets 33 for instance, be energized and armature 34 be moved within certain limits less than one revolution away from its position between said magnets, said armature will be brought back by said magnets into said position immediately upon cessation of the force which moved said armature away from said position. The repeater 21 is thus self-synchronizing within the limit of one revolution of armature 34 corresponding to six degrees or less of movement of pointer 5. Therefore pointer 22 is self synchronous within said six degrees and the insulated strip is made six degrees in length, the length depending of course upon the gearing ratio between repeater motor 21 and pointer 22. The insulation between contact segments 45 and 46 is, however, insufficient to prevent one or the other of said segments from engaging roller 44 whenever pointer 22 is moved beyond the limits within which it is self-synchronizing. In other words, when pointer 22 falls out of synchronism with its transmitter to such an extent at least one revolution that it cannot be brought back into synchronism by the action of its own magnets, the circuit through motor 48 is closed to cause the armature of said motor to move in one direction or the other, until roller 44 engages the insulation between contact segments 45 and 46, whereupon the armature 34 is brought into a position such that its own magnets return it and pointer 22 into synchronism with transmitter 7.

If desirable a relay 65 may be connected in series with the roller 44, the back contacts of said relay being connected in series with a lamp or other signal or indicator 66 across the line, 35, 36. When the pointers 5 and 22 are in synchronism the relay 65 will be deenergized and the lamp 66 will glow indicating this condition.

It will be readily appreciated, by those skilled in the art, that if the system of transmission 40, 41 were employed to drive the indicator 22 directly and the system 7, 21 dispensed with the error in indication would be very high although synchronism would be roughly maintained. On the other hand if the system 7, 21 is used alone and the gearing is such as to give the required accuracy of indications loss of synchronism results for reasons already pointed out. My combined system embodies the advantages of both of the systems referred to above without the disadvantages thereof.

The invention as thus far disclosed is susceptible of modification in various ways. Thus other types of synchronous instruments, for example, of the same type as instrument 40, 41, may be substituted for transmitter 7 and repeater 21. Furthermore in order to avoid excessive and unnecessary load on the repeater 21, which would tend to pull the latter out of step with its transmitter, means may be provided for disconnecting the armature of motor 48 from the gear 26 except when said motor is energized.

One form of such means is shown in Fig. 6 and may be constructed substantially as follows:

The gear 50' which corresponds to the gear 50 in Figs. 1 and 3 is loosely mounted on the shaft of the pinion 51 and is provided with a series of pins 101 adapted to enter a series of holes or recesses 102 provided in a disk 103. The latter is fixedly secured to the shaft of the pinion 51 so that when the gear 50' is in elevated position a drive connection is established between the motor 48 and gear 26 but when said gear 50' is in lower position this drive connection is broken. For raising the gear 50' I have shown a collar 104 loose on the shaft of pinion 51 connected by means of a pin and slot connection 105 to one end of a lever 106. The latter is shown pivoted at 107 to the frame 108 and link connected, at the end opposite the collar 104, to the armature 109 of an electro-magnet 110 which may be secured to the frame 108. A spring 111 may be provided for aiding gravity in moving gear 50' to disengaging or inoperative position. The magnet 110 is adapted to be energized on energization of motor 48. Thus in Fig. 7 I have shown said magnet connected in series with the armature of said motor 48.

Obviously if the sending and receiving instruments are in synchronism the magnet 110 will be deenergized and armature of motor 48 will not be actuated by the repeater 21 since contact 44 will remain on the insulation between segments 45 and 46. On loss of synchronism however the clutch 50', 103 becomes operative, due to energization of magnet 110, until synchronism is reestablished as previously pointed out.

As previously set forth the motor 48 is at times called upon to move the armature 34 of repeater 21 against the pull of the fields 31, 32 and 33. The power and size of motor 48 may be materially reduced by deenergizing said fields whenever the motor 48 is operating. This function may be accomplished, as indicated in Fig. 7, by connecting the common return of the transmitter to its line wire through the back contacts of relay 65. It will be seen that, by virtue of this arrangement, whenever motor 48 is energized the relay 65 will attract its armature to break the energizing circuit of repeater 21. When the roller 44 reaches the insulation between segments 45, 46 the relay 65 allows the repeater to be reenergized.

In accordance with the provision of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I desire to secure by Letters Patent is:

1. In combination, a plurality of impulse transmitting means, a plurality of repeating means connected to said transmitting means and driven therefrom respectively, a normally deenergized motor adapted to actuate one of said repeating means, and means jointly controlled by said repeating means for calling said motor into action to actuate said repeating means when the latter loses step with said transmitting means.

2. In a remotely controlled instrument, a plurality of electrically responsive repeating devices and means including a motor jointly controlled by said repeating devices for exerting a torque on one of said repeating devices.

3. In combination, a movable member, a plurality of repeater devices for actuating said member, a plurality of transmitters electrically connected to said repeater devices respectively, a normally inoperative translating device for actuating said member and means jointly controlled by said repeater devices for calling said translating device into action when one of said repeater devices leads or lags behind one of said transmitters a predetermined amount.

4. In combination, a movable member, a normally deenergized translating device for actuating said member, a repeater translating device for actuating said member, a second repeater device and means controlled jointly by said repeater devices for controlling said translating device.

5. In combination with a movable member, a transmitter, a repeater motor electrically connected with said transmitter and adapted to drive said member, step-up gearing from said repeater motor to said member, said movable member being self synchronous within certain limits, means for restoring synchronism between said transmitter and movable member, and means whereby said first named means is rendered ineffective within the limits in which said movable member is self synchronous.

6. In combination, a movable member, a first repeater device for actuating said member, a first transmitter for controlling said repeater, a second repeater device, a second transmitter for controlling said second repeater device, said first repeater device being self-synchronizing within the limits of accuracy of said second repeater device, a normally deenergized motor for actuating said member, and means controlled jointly by said repeater devices for calling said motor into action when the loss of synchronism between said first repeater and said first transmitter exceeds said limits for actuating said first repeater to restore synchronism within said limits.

7. In combination, a movable member, a first repeater device for actuating said member, a first transmitter for controlling said repeater device, a second repeater device, a second transmitter for controlling said second repeater device, a normally deenergized motor for actuating said member, and means controlled jointly by said repeater devices for energizing said motor when one of said repeater devices leads or lags behind its transmitter a predetermined amount.

8. In combination with a movable member, a transmitter, a repeater motor electrically connected with said transmitter and adapted to drive said member, step-up gearing from said repeater motor to said member, said repeater motor being self-synchronous within certain limits, means for restoring synchronism outside of said limits and simultaneously deenergizing said motor and means for restoring synchronism between said transmitter and repeater motor within said limits without deenergizing said motor.

9. In combination with a movable member, a transmitter, a repeater motor connected to said transmitter and said member, step-up gearing from said repeater motor to said member, said motor being self-synchronous within certain limits, means for restoring synchronism outside of said limits and simultaneously rendering said motor inoperative and means for restoring synchronism between said transmitter and repeater motor within said limits without rendering said motor inoperative.

10. In apparatus for controlling movements at a distance, the combination with a coarse but not always synchronous repeater device and a fine but always synchronous repeater device, of a movable member normally driven from one of said devices, a normally deenergized motor for driving said movable member, and means controlled by the relative position of said devices for calling said motor into action to actuate said latter device when it loses step with said former device.

11. In apparatus for controlling movements at a distance, a sending instrument comprising a movable member, a coarse and a fine transmitter simultaneously controlled by said member, and a receiving instrument comprising a movable member, a repeater motor for the coarse transmitter and a repeater motor for the fine transmitter for driving said member, a normally deenergized motor, means controlled by both of said other motors for actuating said last named motor when said receiving instrument is out of step with the sending instrument.

12. In a remotely controlled instrument, a movable member, a plurality of electrically responsive repeating devices, a normally deenergized translating device electrically connected to said repeating devices, and means jointly controlled by said repeating devices for energizing said translating device when said repeating devices are out of synchronism.

13. In combination, a movable member, a plurality of repeater devices for actuating said member, a plurality of jointly controlled transmitters electrically connected to said repeater devices respectively, a normally deenergized motor for actuating said member, and means jointly controlled by said repeater devices for calling said motor into action when said repeating devices are out of synchronism.

In testimony whereof I have affixed my signature.

ELEMER MEITNER.